United States Patent
Lau et al.

(10) Patent No.: US 10,111,073 B2
(45) Date of Patent: *Oct. 23, 2018

(54) SYSTEM AND METHOD OF BLUETOOTH PAIRING WITH A GROUP OF BLUETOOTH DEVICES

(71) Applicant: BBPOS LIMITED, Tsuen Wan (HK)

(72) Inventors: Chi Man Lau, Hong Kong (HK); Tai Kwan Jimmy Tang, Hong Kong (HK); Chi Wah Lo, Hong Kong (HK)

(73) Assignee: BBPOS LIMITED, Tsuen Wan (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,253

(22) Filed: Jan. 23, 2017

(65) Prior Publication Data

US 2017/0134890 A1 May 11, 2017

Related U.S. Application Data

(63) Continuation of application No. 14/728,152, filed on Jun. 2, 2015.
(Continued)

(51) Int. Cl.
| | |
|---|---|
| *H04W 4/00* | (2018.01) |
| *H04W 4/80* | (2018.01) |
| *H04W 4/08* | (2009.01) |
| *H04W 76/14* | (2018.01) |
| *H04W 84/18* | (2009.01) |

(52) U.S. Cl.
CPC ............... *H04W 4/80* (2018.02); *H04W 4/08* (2013.01); *H04W 76/14* (2018.02); *H04W 84/18* (2013.01)

(58) Field of Classification Search
CPC ........................................................ H04W 4/00
See application file for complete search history.

(56) References Cited

U.S. PATENT DOCUMENTS

| 8,347,366 B2 | 1/2013 | Lee |
| 8,438,288 B2 | 5/2013 | Suarez et al. |

(Continued)

FOREIGN PATENT DOCUMENTS

| EP | 2391109 | 11/2011 |
| WO | WO03017579 | 2/2003 |
| WO | WO2013191648 | 12/2013 |

*Primary Examiner* — Wen Huang
(74) *Attorney, Agent, or Firm* — Gregory M. Howison (57) ABSTRACT

A method for pairing a first Bluetooth device with an individual Bluetooth device address with a group of Bluetooth devices, said method comprising: assigning a group Bluetooth device address to each of said group of Bluetooth devices; the first Bluetooth device exchanging Bluetooth device addresses with a second Bluetooth device from said group of Bluetooth devices when said first Bluetooth device comes within communication range of said second Bluetooth device; establishing a link key; storing the group Bluetooth device address and the link key; the first Bluetooth device exchanging Bluetooth device addresses with a third Bluetooth device from said group of Bluetooth devices when said first Bluetooth device comes within communication range of said third Bluetooth device; recognizing the group Bluetooth device address assigned to the third Bluetooth device; and establishing a communications channel between said first Bluetooth device and said third Bluetooth device based on said link key.

20 Claims, 7 Drawing Sheets

Related U.S. Application Data

(60) Provisional application No. 62/008,825, filed on Jun. 6, 2014.

(56) References Cited

U.S. PATENT DOCUMENTS

| | | | |
|---|---|---|---|
| 8,607,318 B2* | 12/2013 | Huang | G06F 21/35 380/270 |
| 8,699,944 B2 | 4/2014 | Malamud et al. | |
| 2002/0174364 A1 | 11/2002 | Nordman et al. | |
| 2004/0014422 A1 | 1/2004 | Kallio | |
| 2004/0240723 A1 | 12/2004 | Sakai et al. | |
| 2004/0247023 A1* | 12/2004 | Sasai | H04L 63/0492 375/220 |
| 2007/0141987 A1* | 6/2007 | Weinans | H04W 8/26 455/41.2 |
| 2007/0202807 A1 | 8/2007 | Kim | |
| 2011/0078445 A1 | 3/2011 | Xiao et al. | |
| 2011/0319022 A1 | 12/2011 | Arad et al. | |
| 2012/0238216 A1 | 9/2012 | Hallowell et al. | |
| 2012/0322466 A1 | 12/2012 | Das et al. | |
| 2013/0029596 A1 | 1/2013 | Preston et al. | |
| 2013/0288604 A1* | 10/2013 | Chang | H04W 84/18 455/41.2 |
| 2014/0094119 A1* | 4/2014 | Stojanovski | H04W 4/70 455/41.1 |
| 2014/0134951 A1* | 5/2014 | Paulson | H04B 7/2603 455/41.2 |
| 2014/0194063 A1* | 7/2014 | Bahadirov | H04W 8/005 455/41.2 |

\* cited by examiner

SYSTEM AND METHOD OF BLUETOOTH PAIRING WITH A GROUP OF BLUETOOTH DEVICES

CROSS-REFERENCE TO RELATED APPLICATIONS

This application is a continuation of U.S. patent application Ser. No. 14/728,152, filed on Jun. 2, 2015, entitled SYSTEM AND METHOD OF BLUETOOTH PAIRING WITH A GROUP OF BLUETOOTH DEVICES, which claims the benefit of U.S. Provisional Application No. 62/008,825, filed on Jun. 6, 2014, entitled SYSTEM AND METHOD OF BLUETOOTH PAIRING WITH A GROUP OF BLUETOOTH DEVICES, the specifications of which are incorporated herein by reference in their entirety.

TECHNICAL FIELD

The present disclosure relates to Bluetooth systems and devices.

SUMMARY

A method for pairing a first Bluetooth device with an individual Bluetooth device address with a group of Bluetooth devices, said method comprising: assigning a group Bluetooth device address to each of said group of Bluetooth devices; the first Bluetooth device exchanging Bluetooth device addresses with a second Bluetooth device from said group of Bluetooth devices when said first Bluetooth device comes within communication range of said second Bluetooth device; establishing, by the first Bluetooth device and the second Bluetooth device, a link key; storing, by the first Bluetooth device, the group Bluetooth device address and the link key; the first Bluetooth device exchanging Bluetooth device addresses with a third Bluetooth device from said group of Bluetooth devices when said first Bluetooth device comes within communication range of said third Bluetooth device; recognizing, by the first Bluetooth device, the group Bluetooth device address assigned to the third Bluetooth device; and establishing a communications channel between said first Bluetooth device and said third Bluetooth device based on said link key.

A system for a first Bluetooth device with an individual Bluetooth device address to communicate with a group of Bluetooth devices, said system comprising: each of said group of Bluetooth devices having the same group Bluetooth device address; the first Bluetooth device exchanging Bluetooth device addresses with a second Bluetooth device from said group of Bluetooth devices when said first Bluetooth device comes within communication range of said second Bluetooth device; the first Bluetooth device and the second Bluetooth device establishing a link key, wherein said link key is stored by the first Bluetooth device; the first Bluetooth device exchanging Bluetooth device addresses with a third Bluetooth device from said group of Bluetooth devices when said first Bluetooth device comes within communication range of said third Bluetooth device; the first Bluetooth device recognizing the group Bluetooth device address assigned to the third Bluetooth device; and the first Bluetooth device establishing a communications channel with the third Bluetooth device based on said link key.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

For a more complete understanding, reference is now made to the following description taken in conjunction with the accompanying Drawings in which.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Referring now to the drawings, wherein like reference numbers are used herein to designate like elements throughout, the various views and embodiments of a system and method of bluetooth pairing with a group of bluetooth devices are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The Bluetooth protocol is a personal area networking (PAN) protocol designed to allow Bluetooth-enabled devices or Bluetooth devices to communicate with each other within a confined area. For example, a Bluetooth enabled headset can communicate with a Bluetooth enabled mobile phone. For two devices to communicate using the Bluetooth protocol, the devices must first be "paired".

During the pairing process, the two devices establish a shared secret known as a link key. After the pairing process, the devices can optionally store the link key so that the pairing process is not required afterwards. Then the devices can "bond" whenever they are close enough, that is, the devices can automatically establish a connection whenever they are close enough. Pairing may also require an authentication process where a user must validate the connection between the two Bluetooth devices.

If either or both of the paired devices remove the link key, the devices are no longer paired and can therefore no longer bond. The pairing process must be repeated to establish a new link key for the next communication.

Normally, each Bluetooth device has a 6-byte device address called BD_ADDR (which stands for Bluetooth Device Address) that uniquely identifies the device. When two devices are brought within wireless communication range, the two devices will exchange their BD_ADDR to see if they are already paired. If the BD_ADDR is recognized and a stored link key is available, the two devices can use the link key to bond, that is, they will re-establish the Bluetooth communication channel without the need to go through the pairing process.

In some Bluetooth devices, the pairing process requires human intervention. For example, in mobile phones with Bluetooth capabilities, the mobile operating system (OS) may prompt the user for confirmation and authentication. Depending on the OS implementation, this behavior may not be disabled.

With the growth in popularity of the Bluetooth protocol, there is an increasing need for a Bluetooth device to communicate with multiple Bluetooth devices. Therefore the number of pairing operations required also begins to grow. This can become inconvenient for users, leading to increased frustration with the Bluetooth protocol on the part of the users. This is especially burdensome on a user, if each pairing operation requires authentication as well.

For example, in one embodiment, in a shopping mall, multiple Bluetooth devices known as Bluetooth beacons that interact with Bluetooth mobile phones are present. These Bluetooth beacons are used for a variety of purposes including geofencing, microlocation and information broadcasting.

In one embodiment, these Bluetooth beacons are implemented using Bluetooth Low Energy (BLE) technology. The advantage of BLE is in its lower power consumption. Furthermore, in BLE, in one embodiment, pairing is implemented using a mode called Just-Work where no confirmation is required from the user. In BLE broadcast mode, no pairing is required. However BLE offers a limited data rate and is therefore not useful for data traffic.

In another embodiment, these Bluetooth beacons are implemented using the Classic Bluetooth protocol. The Classic Bluetooth protocol allows for a higher data rate but consumes more power in doing so.

In such a situation, requiring a user or shopper to have to pair their device with a beacon each time would be inconvenient and annoying to the user/shopper, especially if each time the user/shopper is required to authenticate the pairing.

The method and system presented in the rest of the specification aims to overcome this problem. The method and system allows a Bluetooth device to pair with a group of Bluetooth devices and only requires pairing with any one of the devices in that group. In one embodiment, the devices operate in classic Bluetooth mode. In a further embodiment, the devices also have an alternative communication channel to communicate the link key. The alternative communication channel does not require explicit pairing. In another embodiment, this alternative channel is a BLE operating in Just-Work pairing mode.

In one embodiment, this is achieved using the following: Instead of having a unique BD_ADDR for each of the devices in the group, the whole group shares the same BD_ADDR. Thus, the pairing is a pairing between the mobile device and the group.

Figure 1:
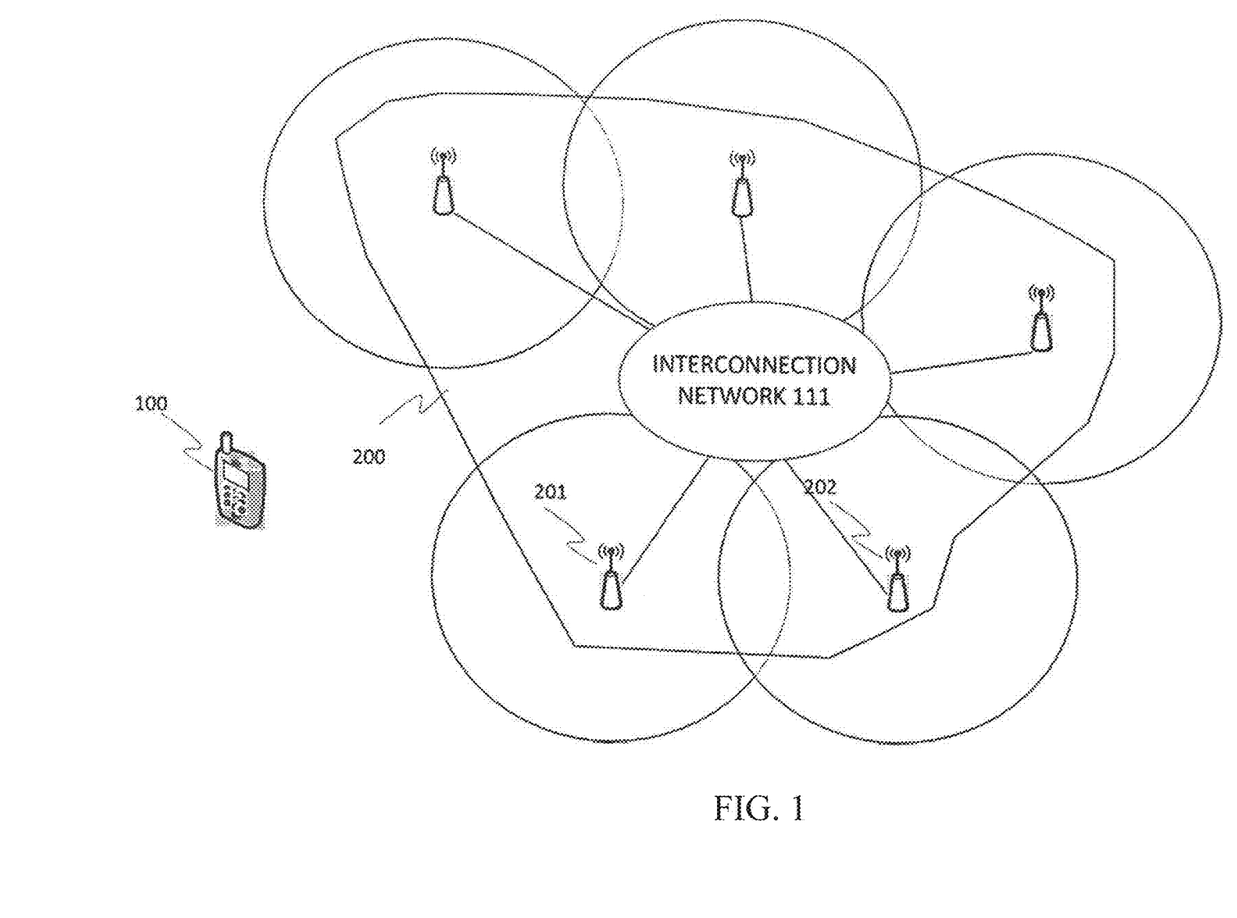
FIG. 1 shows a Bluetooth device 100 and a group of Bluetooth devices 200.

An example is shown in FIG. 1. In FIG. 1, beacon devices 201 and 202 are part of group 200. All the devices in group 200 are assigned the same group BD_ADDR. Bluetooth device 100 has not yet been paired with any of the devices in group 200. In one embodiment, at least some or all of the devices which are part of group 200 are connected to each other via a separate interconnection network such as interconnection network 111. This interconnection network 111 is, for example, a wireless network, a local area network, an optical network or any appropriate type of network known to one of skill in the art.

Figure 2A:
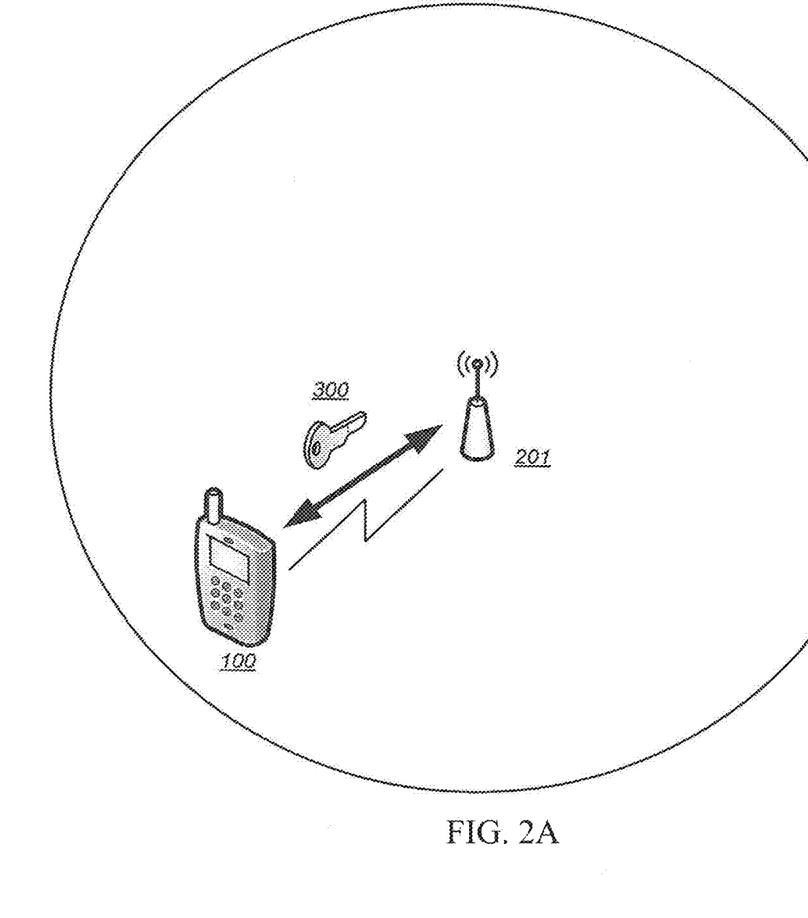
FIG. 2A shows a device 100 pairing with device 201 of group 200 within a distributed embodiment.
Figure 2B:
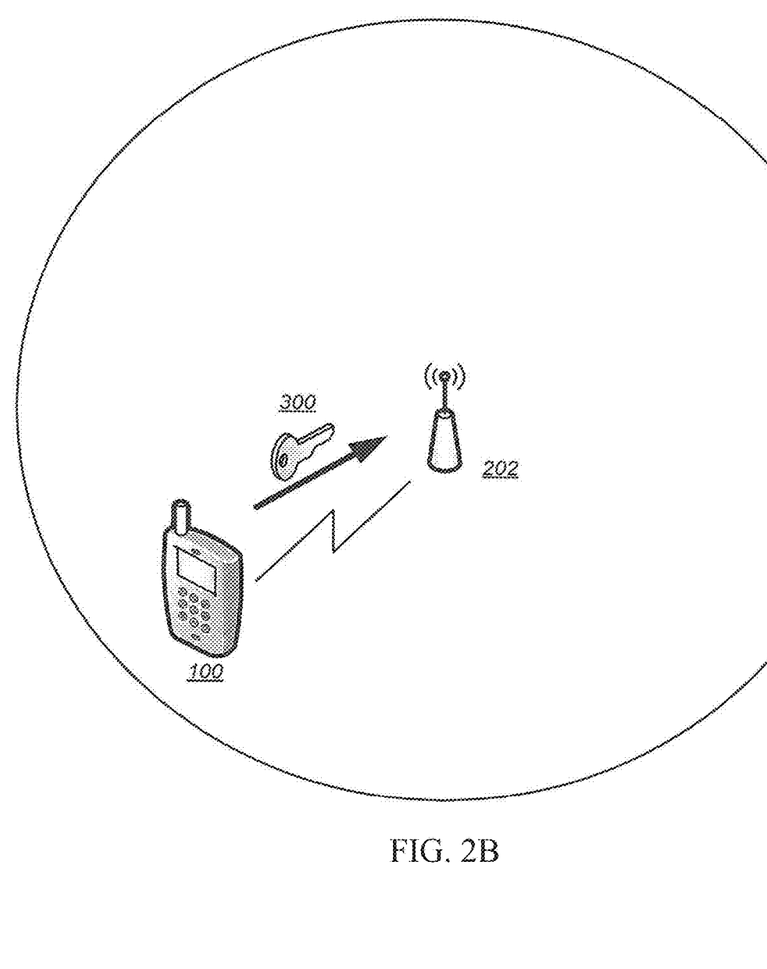
FIG. 2B shows device 100 sharing a link key 300 with device 202 of group 200 after recognizing the BD_ADDR of device 202 within the distributed embodiment.
Figure 2C:
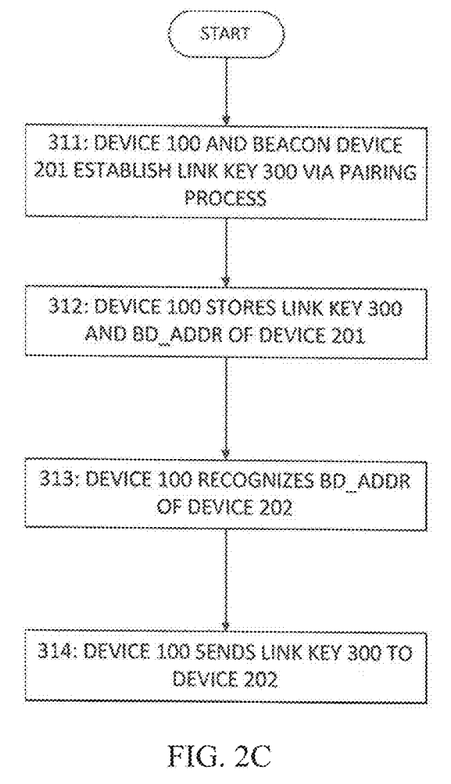
FIG. 2C is a flowchart of the operation of the distributed embodiment demonstrated in FIGS. 2A and 2B.

In one embodiment, the sharing of the group BD_ADDR and link key is performed using a distributed embodiment. FIGS. 2A-2C demonstrate operation of the distributed embodiment. In FIG. 2A, when the device 100 comes within the communication range of device 201 of the group, a pairing process starts. The device 100 does not recognize the BD_ADDR of the device 201, which is the group BD_ADDR of group 200, and the user of the device 100 is prompted to accept the connection. The connection is performed using classic Bluetooth. Devices 100 and 201 exchange their BD_ADDR and establish a shared link key 300 (step 311 of FIG. 2C). Device 100 stores the BD_ADDR of device 201 and the associated link key 300 in its memory (step 312 of FIG. 2C).

In FIG. 2B, when the device 100 comes within the communication range of device 202 of the same group 200, it exchanges BD_ADDR with device 202. Device 100 recognizes the BD_ADDR of device 202, because device 202 has the same group BD_ADDR as the device 201 (step 313 of FIG. 2C). At this point, device 100 transmits the shared link key 300 to the device 202, and device 100 and device 202 establish communications (step 314 of FIG. 2C).

In one embodiment, device 100 shares link key 300 with device 202 over an alternative BLE communication channel. In another embodiment, device 100 shares link key 300 using near field communications (NFC). In another embodiment, device 100 shares link key 300 with device 202 using Wi-Fi. Once the device 202 knows the shared link key 300, it establishes a classic Bluetooth mode communication channel with the device 100.

In the whole process above, the devices in the group can operate in a distributed manner without the need of a centralized server or moderator. In an alternative embodiment, all the devices are connected together via the interconnection network and there is a centralized server or moderator connected to the devices via the interconnection network. The devices communicate with the centralized server via the interconnection network.

Figure 3A:
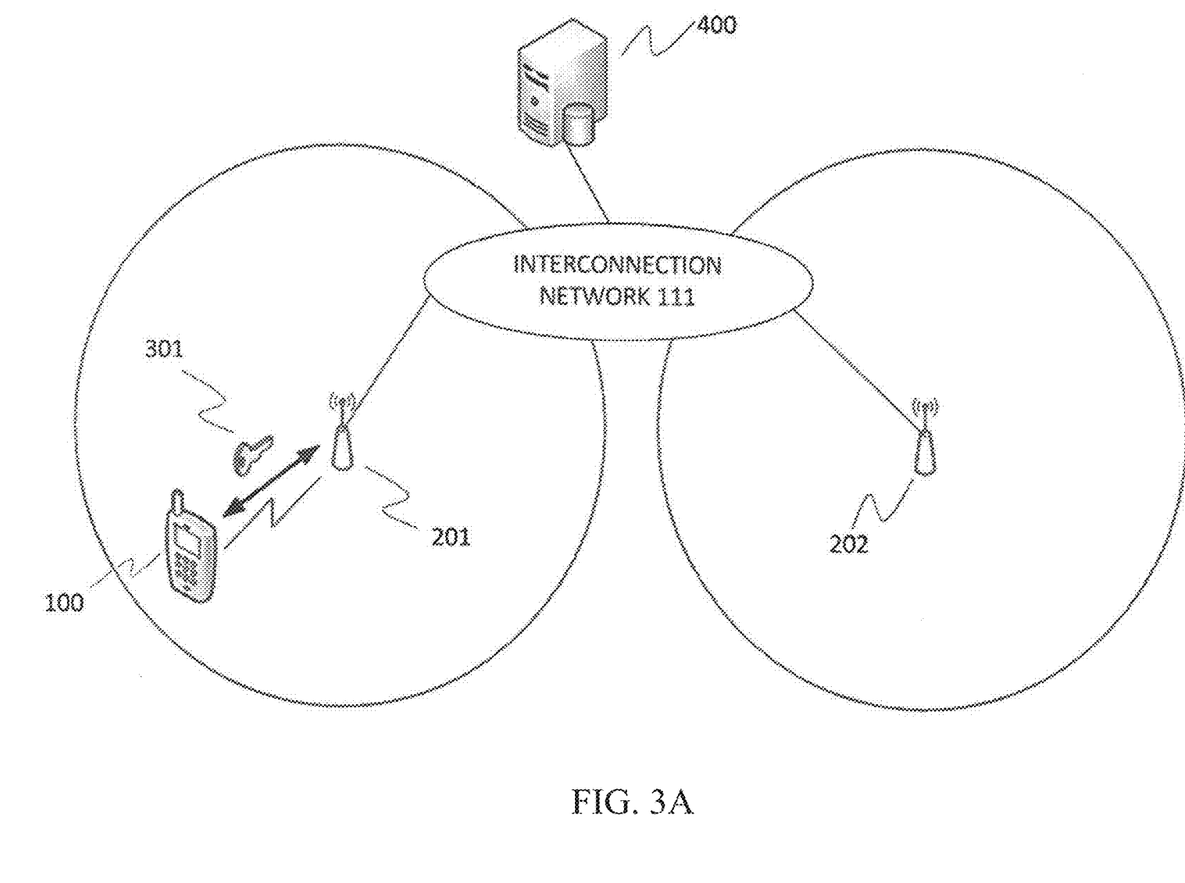
FIG. 3A shows a device 100 pairing with device 201 of group 200 within a centralized embodiment.
Figure 3B:
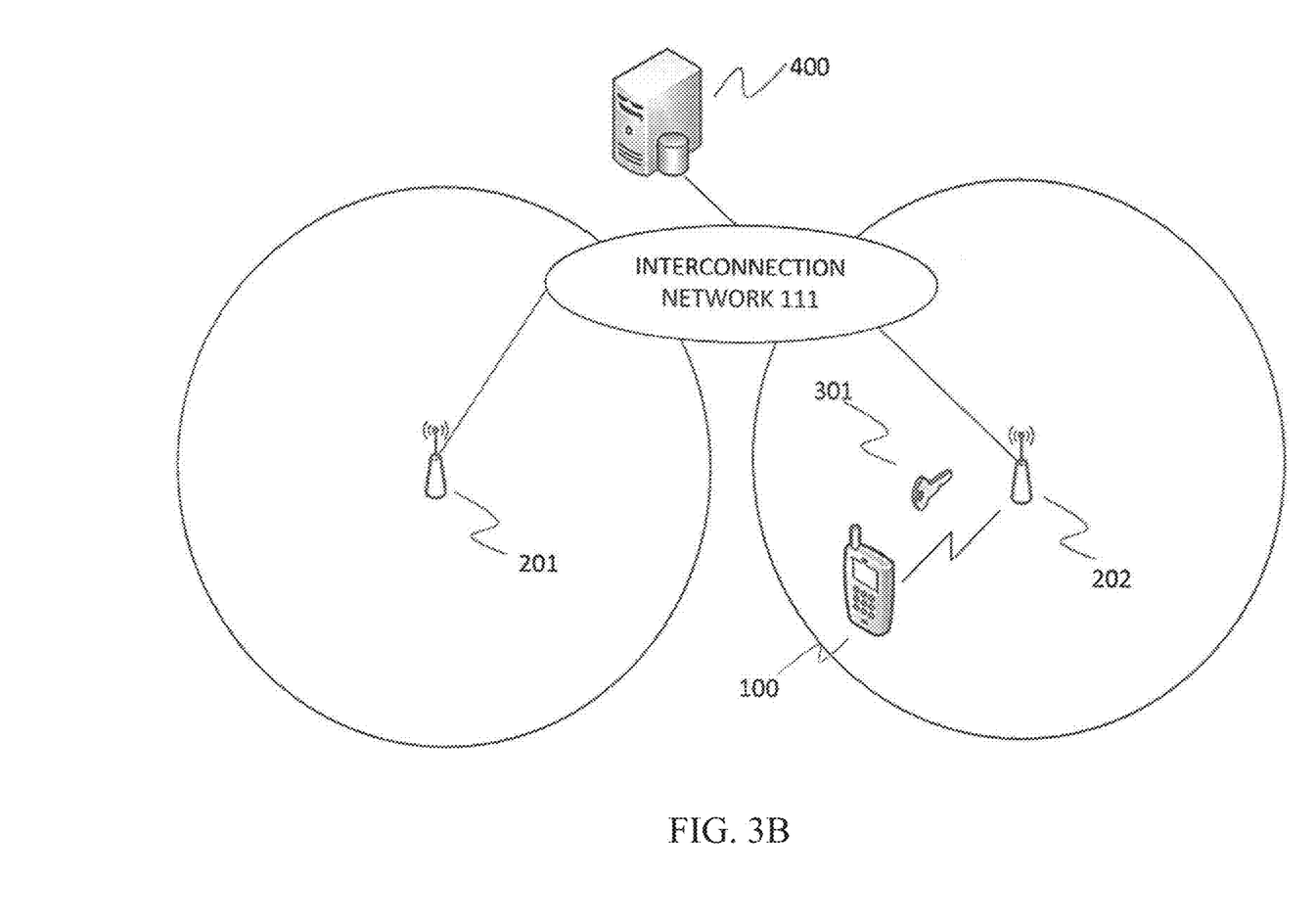
FIG. 3B shows a device 202 sharing link key 301 with device 100 within a centralized embodiment.
Figure 3C:
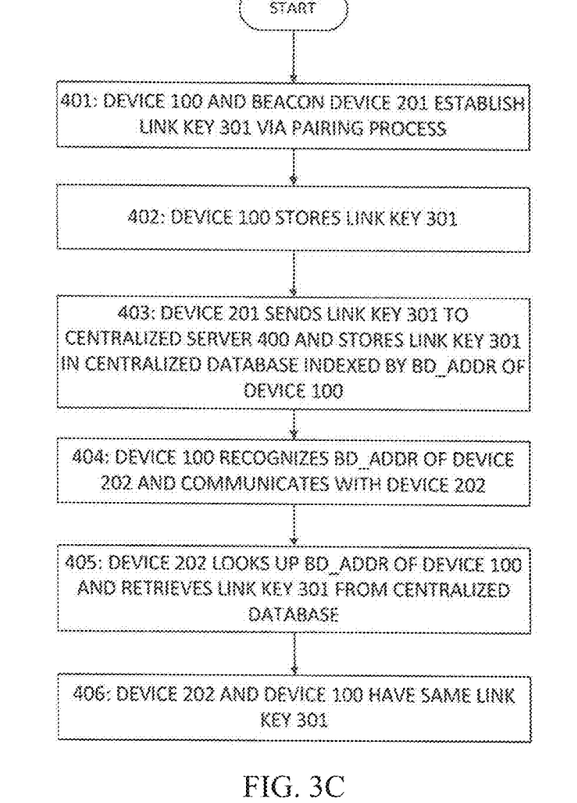
FIG. 3C is a flowchart of the operation of the centralized embodiment demonstrated in FIGS. 3A and 3B.

FIGS. 3A-3C shows an alternative embodiment using a centralized server or moderator. In FIG. 3A, the beacon devices within the group 200 are connected to a centralized server 400 via the interconnection network 111. In one embodiment, the centralized server further comprises a centralized database. In another embodiment, the centralized server is separate from the centralized database, but still connected to the centralized database. As before, device 100 and device 201 establish a link key 301 at the beginning via a pairing process (step 401 of FIG. 3C). Device 100 stores the link key 301 locally (step 402 of FIG. 3C). Device 201 sends link key 301 to the centralized server 400, which then stores link key 301 in the centralized database indexed by the BD_ADDR of device 100. (step 403 of FIG. 3C)

In FIG. 3B, when the device 100 approaches device 202, device 202 exchanges BD_ADDR with device 100. Device 100 recognizes the BD_ADDR of device 202, and communicates to device 202 that it recognizes the BD_ADDR of device 202 since it is the same as the BD_ADDR of device 201 (step 404 of FIG. 3C). Then device 202 looks up the BD_ADDR of device 100 in the centralized database and retrieves link key 301 from the centralized database. (step 405 of FIG. 3C) This way, the device 100 and the device 202 have the same link key 301 and no pairing is required. (step 406 of FIG. 3C) The centralized mode offers advantages over the distributed mode. In the distributed mode, there is a requirement for an alternative channel using a technology such as BLE. However, in the centralized mode this alternative channel is not required. Therefore a mobile device which does not have BLE capability can also use this scheme. Also, having a centralized mode offers the possibility of a more complicated authentication scheme. In one embodiment, the centralized server causes the link key 301 to expire after a fixed period, for example, one day, one week or one month.

In a further embodiment, both distributed and centralized modes are used. This is useful in a situation where there are many users of devices sharing link keys with the devices in group 200, or if the interconnection network to the centralized server is slow or unavailable. Then, using only centralized mode could excessively burden the centralized server. In this embodiment, the devices within group 200 will communicate with the centralized server to retrieve the link key. However if, for example, the centralized server is excessively overloaded, or the interconnection network with the centralized server is excessively overloaded, then each of the devices within group 200 will communicate with the user device to share link keys.

The devices in group 200 can all be located together in one location or geographically distributed over various locations. In one embodiment the devices in group 200 are spread out over two or more locations. This is useful if, for example, all the devices in group 200 are provided by one service provider operating in two or more locations.

In a further embodiment, if more link security is required to share the key using the alternative channel, the security can be provided in the application layer.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for pairing a first Bluetooth device with a plurality of Bluetooth devices, the method comprising:
   a second Bluetooth device receiving a first device address from the first Bluetooth device, the second Bluetooth device being one of the plurality of Bluetooth devices;
   the second Bluetooth device transmitting a group Bluetooth address to the first Bluetooth device;
   establishing, by the first Bluetooth device and the second Bluetooth device, a link key, the second Bluetooth device storing the link key;
   a third Bluetooth device receiving the first device address from the first Bluetooth device, the third Bluetooth device being one of the plurality of Bluetooth devices;
   the third Bluetooth device transmitting the group Bluetooth address to the first Bluetooth device; and
   the third Bluetooth device receiving the link key based on recognition of the group Bluetooth address, and establishing a communications channel between the first Bluetooth device and the third Bluetooth device based on the link key.

2. The method of claim 1 wherein the second Bluetooth device and the third Bluetooth device are connected by a network.

3. The method of claim 2 wherein the second Bluetooth device stores the link key on a server.

4. The method of claim 3 wherein the server comprises a database and the link key is stored in the database using the first device address as an index to the link key.

5. The method of claim 4 wherein the link key expires after a predetermined period of time.

6. The method of claim 1 wherein the third Bluetooth device receives the link key from the first Bluetooth device.

7. The method of claim 6 wherein the third Bluetooth device receives the link key from the first Bluetooth device over a communications network separate from the communications channel.

8. A method for pairing a first Bluetooth device with a plurality of Bluetooth devices, the method comprising:
the first Bluetooth device transmitting a first device address to a second Bluetooth device, the second Bluetooth device being one of the plurality of Bluetooth devices;
the first Bluetooth device receiving a group Bluetooth address from the second Bluetooth device;
establishing, by the first Bluetooth device and the second Bluetooth device, a link key, the first Bluetooth device storing the link key;
the first Bluetooth device transmitting the first device address to a third Bluetooth device, the third Bluetooth device being one of the plurality of Bluetooth devices;
the first Bluetooth device receiving the group Bluetooth address from the third Bluetooth device; and
the third Bluetooth device receiving the link key based on recognition of the group Bluetooth address, and establishing a communications channel between the first Bluetooth device and the third Bluetooth device based on the link key.

9. The method of claim 8 wherein the second Bluetooth device and the third Bluetooth device are connected by a network.

10. The method of claim 9 wherein the second Bluetooth device stores the link key on a server, the server communicating with the second Bluetooth device and the third Bluetooth device over the network, the third Bluetooth device receiving the link key from the server.

11. The method of claim 10 wherein the server comprises a database and the link key is stored in the database using the first device address as an index to the link key.

12. The method of claim 11 wherein the link key expires after a predetermined period of time.

13. The method of claim 8 wherein the first Bluetooth device transmits the link key to the third Bluetooth device.

14. The method of claim 13 wherein the first Bluetooth device transmits the link key to the third Bluetooth device over a communications network separate from the communications channel.

15. A system to allow a first Bluetooth device to pair with a plurality of Bluetooth devices, the system comprising:
a second Bluetooth device, the second Bluetooth device being one of the plurality of Bluetooth devices, the second Bluetooth device receiving a first device address from the first Bluetooth device, the second Bluetooth device transmitting a group Bluetooth address to the first Bluetooth device, the first Bluetooth device and the second Bluetooth device establishing a link key, the second Bluetooth device storing the link key;
a third Bluetooth device being one of the plurality of Bluetooth devices, the third Bluetooth device receiving the first device address from the first Bluetooth device;
the third Bluetooth device transmitting the group Bluetooth address to the first Bluetooth device; and
the third Bluetooth device receiving the link key based on recognition of the group Bluetooth address, and establishing a communications channel between the first Bluetooth device and the third Bluetooth device based on the link key.

16. The system of claim 15 wherein the second Bluetooth device and the third Bluetooth device are connected by a network.

17. The system of claim 16 wherein the second Bluetooth device stores the link key on a server, the server communicating with the second Bluetooth device and the third Bluetooth device over the network, the third Bluetooth device receiving the link key from the server.

18. The system of claim 17 wherein
the server comprises a database and the link key is stored in the database using the first device address as an index to the link key;
the first Bluetooth device recognizes the group Bluetooth address transmitted by the third Bluetooth device;
the first Bluetooth device communicates the recognition of the group Bluetooth address to the third Bluetooth device; and
the third Bluetooth device receives the link key from the server based on a lookup of the database using the first device address.

19. The system of claim 16, wherein
the second Bluetooth device stores the link key on a server communicating with the second Bluetooth device and the third Bluetooth device over the network; and
the third Bluetooth device receives the link key from the first Bluetooth device when either the server or the network is overloaded.

20. The system of claim 15 wherein the third Bluetooth device receives the link key from the first Bluetooth device over a communications network separate from the communications channel.

* * * * *